(12) United States Patent
Jin (10) Patent No.: US 11,499,521 B2
(45) Date of Patent: Nov. 15, 2022

(54) POWER GENERATION DEVICE

(71) Applicant: Jun Jin, Beijing (CN)

(72) Inventor: Jun Jin, Beijing (CN)

(\*) Notice: Subject to any disclaimer, the term of this patent is extended or adjusted under 35 U.S.C. 154(b) by 156 days.

(21) Appl. No.: 17/004,297

(22) Filed: Aug. 27, 2020

(65) Prior Publication Data

US 2021/0062782 A1 Mar. 4, 2021

(30) Foreign Application Priority Data

Aug. 29, 2019 (CN) .......................... 201910805947.2

(51) Int. Cl.
*F03D 1/06* (2006.01)
*H02S 10/12* (2014.01)
(Continued)

(52) U.S. Cl.
CPC ........... *F03D 1/0641* (2013.01); *F03D 3/061* (2013.01); *F03D 3/062* (2013.01); *F03D 7/042* (2013.01);
(Continued)

(58) Field of Classification Search
CPC ........ F03D 1/0641; F03D 1/061; F03D 1/062; F03D 1/06; F03D 1/064; F03D 9/25; F03D 13/20; F03D 17/00; F03D 7/042; F03D 7/04; H02S 10/12; H02S 20/30; F05B 2220/708; F05B 2240/301; F05B 2240/302; F05B 2260/4031; F05B 2260/406;
(Continued)

(56) References Cited

U.S. PATENT DOCUMENTS 4,004,861 A * 1/1977 Soules .................... F03D 3/067
  416/41
4,134,708 A * 1/1979 Brauser ................... F03D 15/10
  416/17
(Continued)

FOREIGN PATENT DOCUMENTS

CN        1906408 A    1/2007
CN      101220802 A    7/2008
(Continued)

OTHER PUBLICATIONS

First Office Action, including Search Report, for Chinese Patent Application No. 201910805947.2, dated Apr. 27, 2020, 16 pages.

*Primary Examiner* — Brian P Wolcott
*Assistant Examiner* — Joshua R Beebe
(74) *Attorney, Agent, or Firm* — Westman, Champlin & Koehler, P.A.

(57) ABSTRACT

The present application discloses a power generation device so as to solve the generator set overspeed problem. The power generation device comprises: a stand column; and at least one generator set located on the stand column. The generator set comprises a support, blades connected to the support, and a power generator generating power by means of rotation of the blades, and an adjustment device located on the support and used for adjusting a windage area of the blades by moving or rotating the blade according to a wind speed. The wind power generation device may reduce an effective windage area to zero when the wind force is too high, thereby improving stability and applicability in a changeable environment and prolonging the service life of the apparatus.

17 Claims, 6 Drawing Sheets

(51) Int. Cl.
*H02S 20/30* (2014.01)
*F03D 9/25* (2016.01)
*F03D 13/20* (2016.01)
*F03D 15/00* (2016.01)
*F03D 17/00* (2016.01)
*F03D 3/06* (2006.01)
*F03D 7/04* (2006.01)

(52) U.S. Cl.
CPC ............. *F03D 9/25* (2016.05); *F03D 13/20* (2016.05); *F03D 15/00* (2016.05); *F03D 17/00* (2016.05); *H02S 10/12* (2014.12); *H02S 20/30* (2014.12); *F05B 2220/708* (2013.01); *F05B 2240/301* (2013.01); *F05B 2240/302* (2013.01); *F05B 2260/406* (2013.01); *F05B 2260/4031* (2013.01); *F05B 2260/602* (2013.01); *F05B 2270/1011* (2013.01); *F05B 2270/32* (2013.01); *F05B 2270/604* (2013.01); *F05B 2280/107* (2013.01)

(58) Field of Classification Search
CPC ........ F05B 2260/602; F05B 2270/1011; F05B 2270/32; F05B 2270/604; F05B 2280/107
See application file for complete search history.

(56) References Cited

U.S. PATENT DOCUMENTS

| | | | | |
|---|---|---|---|---|
| 4,710,101 A | * | 12/1987 | Jamieson | F03D 7/0252 416/169 R |
| 5,051,059 A | * | 9/1991 | Rademacher | F03D 3/067 416/85 |
| 5,098,264 A | * | 3/1992 | Lew | F04C 2/44 418/268 |
| 6,242,818 B1 | * | 6/2001 | Smedley | F03D 3/065 290/55 |
| 6,682,302 B2 | * | 1/2004 | Noble | F03D 3/068 416/197 R |
| 9,404,477 B2 | * | 8/2016 | Carter | F03D 3/065 |
| 10,539,115 B1 | * | 1/2020 | Rodrigues | F03D 3/068 |
| 2003/0223868 A1 | * | 12/2003 | Dawson | F03D 7/0236 416/1 |
| 2005/0169742 A1 | * | 8/2005 | Kane | F03D 13/22 415/4.4 |
| 2010/0074751 A1 | * | 3/2010 | Brown | F03D 3/067 416/140 |
| 2010/0172759 A1 | * | 7/2010 | Sullivan | F03D 9/25 416/41 |
| 2014/0147273 A1 | * | 5/2014 | Trenberth | F03D 7/06 416/62 |
| 2014/0265598 A1 | * | 9/2014 | Isabella | F03D 9/25 416/146 R |
| 2015/0233352 A1 | * | 8/2015 | Rath | F03D 3/005 416/23 |

FOREIGN PATENT DOCUMENTS

| | | | |
|---|---|---|---|
| CN | 101514674 A | | 8/2009 |
| CN | 102094761 A | | 6/2011 |
| CN | 102367785 A | | 3/2012 |
| CN | 206071795 U | * | 4/2017 |
| CN | 206071795 U | | 4/2017 |
| CN | 106949008 A | | 7/2017 |
| CN | 108131242 A | | 6/2018 |
| CN | 109139362 A | | 1/2019 |
| JP | 2011032887 A | | 2/2011 |
| KR | 20190088863 A | | 7/2019 |
| WO | WO-2013020595 A2 | * | 2/2013 ........... F03D 3/0418 |

* cited by examiner

POWER GENERATION DEVICE

CROSS-REFERENCE TO RELATED APPLICATION

This application claims the benefit of Chinese Patent Application No. 201910805947.2, filed on Aug. 29, 2019, which is incorporated herein by reference in its entirety.

FIELD OF TECHNOLOGY

The present disclosure relates to the technical field of power generation apparatuses, and particularly relates to a combined power generation device generating electric power by use of wind energy and solar energy.

BACKGROUND

A wind power generator is an environment-friendly power generation apparatus with low power generation cost. At present, a horizontal-shaft propeller type wind power generator is widely used, a rotary shaft of this type of wind power generator is horizontally arranged, blades are driven by means of wind power to rotate so as to convert the wind power to electric energy, but a control system of this type of wind power generator has complex structure and high technical difficulty, and a large set requires high material quality and the manufacture cost is extremely high, these factors are not conducive to the promotion and the wide use of the wind power generation of this type. Compared with defects of the horizontal-shaft wind power generator, a vertical-shaft wind power generator has obvious advantages, but overspeed is a common problem of the two types. At present, for controlling the overspeed of the wind power generator, patents about some new types of wind power generator have appeared. For example, CN 102094761A discloses a wind power generator using a vertical shaft, but a windage area (or wind area) of its blades is limited, and a utilization rate of the wind energy during a starting state is low; and at a high wind speed, the blades are unfolded outwards by centrifugal force, rotational inertia is increased, and a rotation speed is limited so as to prevent the overspeed of the wind power generator. But this method cannot reduce the windage area of the wind power generator to zero, the overspeed problem of the wind power generator cannot be solved fundamentally in a gale or storm wind weather, and this method increases an entire side-direction windage area of the wind power generator, thus the wind power generator is more likely to shake and become unstable, even may overturn, causing a risk of damage when the wind speed is high.

SUMMARY

In view of the problems mentioned above, the objective of the present disclosure is to provide a vertical-shaft wind power generation device. The wind power generation device may reduce an effective windage area thereof to zero under high wind force condition, such that the rotation of a wind power generator set can be effectively prevented from being overspeed when the wind force is high, improving stability and applicability of the device in a changeable environment and prolonging the service life of the device. The wind power generation device is simple and reliable in structure, and has various transformations and high practicality.

The present disclosure provides a power generation device, comprising: a stand column; and at least one generator set located on the stand column, wherein the generator set comprises a support, a plurality of blades each connected to the support, and a power generator generating electric power by means of rotation of the plurality of blades, wherein the generator set further comprises an adjustment device, the adjustment device is located on the support and configured to adjust a windage area of the plurality of blades by moving or rotating the plurality of blades in accordance with wind speed.

Preferably, the adjustment device may reduce the windage area of the plurality of blades to zero.

Preferably, the support is connected to the stand column by means of a bearing, and the support is configured to rotate around the stand column.

Preferably, each of said at least one generator set further comprises a transmission device, the transmission device is configured to transmit the rotation of the plurality of blades to the power generator.

Preferably, each of said at least one generator set further comprises an electric slip ring arranged on the stand column, a control signal is transmitted from a wire inside the stand column to the adjustment device through the electric slip ring, to control the adjustment device to move or rotate the plurality of blades so as to adjust the windage area of the plurality of blades.

Preferably, at least a partial region of outer surfaces of the plurality of blades and said at least one generator set is provided with a solar cell panel, the solar cell panel is configured to rotate along with said at least one generator set and provide electric energy generated by the solar cell panel to the wire of the stand column through an electric slip ring.

Preferably, the stand column is further provided with an anemograph, the adjustment device is configured to adjust the windage area of the plurality of blades in accordance with the wind speed, and under a circumstance that the wind speed is large enough to make said at least one generator set overspeed, the adjustment device is configured to reduce the windage area of the plurality of blades to zero.

Preferably, the generator set has a protective housing, the protective housing is at least partially streamlined, configured to protect each component inside the generator set; an upper section, a middle section and a lower section of the protective housing are fixedly connected into a whole, the upper section of the protective housing is of a closed circular-cone shape, the middle section of the protective housing is of a flat-placed tire shape with upper and lower portions opened, a plurality of open grooves are provided in a side face of the middle section, upper and lower sealing strips making contact with each other are arranged in each one of the plurality of open grooves, the lower section of the protective housing is of a reverse-circular-cone shape with upper and lower portions opened, a side of the lower section is sealed, and the lower section is downwards narrowed gradually toward the stand column but does not make contact with the stand column.

Preferably, each one of the plurality of blades is of a thin-wall bent pipe shape cut in an axial direction, and the plurality of blades are arranged in an array distributed along a circumference direction of the stand column and each extend in a radial direction of the stand column.

Preferably, the adjustment device comprises a plurality of hydraulic rods, a number of the hydraulic rods is equal to a number of the plurality of blades, one end of each hydraulic rod is hinged to the support, the other end of each hydraulic rod is hinged to a middle portion of a corresponding blade of the plurality of blades, the corresponding blade is controlled by means of extension/retraction of the corresponding hydraulic rod to be unfolded and folded, so that the plurality of blades form a spiral-arm-like structure when being unfolded, and the plurality of blades overlap end to end to form a circular ring structure when being folded.

Preferably, each one of the plurality of blades is designed in a sectional type, a first section of one of the plurality of blades is proximal to the support, a second section of said one of the plurality of blades is distal from the support, a diameter of a cross section of the first section of said one of the plurality of blades is less than that of a cross section of the second section of said one of the plurality of blades, and a slope-shaped, arc-shaped or step-shaped transition section is arranged between the first section and the second section of said one of the plurality of blades.

Preferably, a total arc length of the plurality of blades is greater than a total length of a circular ring formed by the plurality of blades being folded; after the plurality of blades are folded, the second section of a first blade, which is any one of the plurality of blades, covers an upper portion of the first section of a second blade which is one of the plurality of blades and adjacently arranged in front of the first blade, an edge of a front end of the first blade is closely attached to the transition section of the second blade, and an upper edge and a lower edge of each one of the plurality of blades are closely attached to the protective housing.

Preferably, the protective housing is complete for the generator set, the protective housing is used for protecting each component inside the generator set, the protective housing is streamlined, and specifically, the protective housing is of an erect rugby-like shape.

Preferably, the generator set further comprises a plurality of blade cabins, the plurality of blade cabins are located on a side of the generator set and each has a thin-wall barrel shape, a radial cross section of each one of the plurality of blade cabins is of a bilaterally-symmetrical oval shape, one end of each one of the plurality of blade cabins is vertically connected to a middle portion of the generator set, the plurality of blade cabins are arranged in a radial array along a circumference direction of the stand column, a total effective windage area is zero, and the support is located inside the corresponding blade cabin.

Preferably, a water outlet hole is arranged in bottom of each of the plurality of blade cabins, and one end, proximal to the stand column, of each of the plurality of blade cabins is provided with a cover plate to block an inner side end of that blade cabin.

Preferably, each of the plurality of blades is of a thin-wall straight circular-pipe shape which is partially cut in longitudinal direction, and has a size matching a corresponding one of the plurality of blade cabins, and is configured to move on the support in a radial direction of the stand column in accordance with the adjustment device, so as to extend out of or retract into the corresponding one of the plurality of blade cabins.

Preferably, a cabin cover is arranged at one end, distal from the support, of each one of the plurality of blades, under a circumstance that one of the plurality of blades retracts into the corresponding one of the plurality of blade cabins, the cabin cover is configured to block an outer side end of the corresponding one of the plurality of blade cabins.

Preferably, the support is provided with a plurality of slide rails, and each one of the plurality of blades is connected to the support by means of a corresponding one of the plurality of slide rails.

Preferably, the protective housing of the generator is integrally streamlined, and under a circumstance that all of the plurality of blades are folded, the generator set is in a completely closed state.

Preferably, at least part of components of the generator set is made of lightweight metal or alloy.

The embodiment of the present disclosure has following advantages and beneficial effects: the power generation device provided by the present disclosure is a vertical-shaft wind power generation device, the adjustment device may adjust the windage area of the plurality of blades by moving or rotating each blade according to wind speed, the effective windage area of the power generation device can be reduced to zero under a circumstance that the wind force is too high, such that the overspeed problem of the generator set can be thoroughly solved, thus the abrasion increase, service life reduction, apparatus shaking and damage, which are caused by the overspeed of the generator set, can be effectively prevented, and the device may have strong stability, adaptability and a relatively long service life. The wind power generation device may further adaptively adjust the windage area thereof according to the wind speed, so as to improve the power generation efficiency thereof.

Further, a partial region of the power generation device is further equipped with one or more solar cell panels for solar power generation, and the device may collect both wind energy and solar energy simultaneously to achieve combined power generation of the wind energy and the solar energy. Each solar cell panel may rotate along with the generator set, such that burning damage caused on that solar cell panel by long-term direct sunlight irradiation may be reduced, prolonging the service life of the solar cell panel.

The power generation device is simple and reliable in structure, the generator set is connected to the stand column by means of the bearing directly or indirectly, such that it is convenient to be disassembled and assembled, and easy to be promoted and used widely; the device further has a plurality of transformations and alternative arrangements, for example, a plurality of generator sets overlay a single stand column longitudinally, such that a floor space is effectively reduced, and the entire generation power is improved; a specific arrangement can be selected according to different actual conditions, such that the practicality is strong; and the device is further provided with the anemograph and may achieve full-automatic adjustment of the blade without manual operation.

BRIEF DESCRIPTION OF THE DRAWINGS

The above description, other objectives, features and advantages of the present disclosure will become more apparent from the description of the embodiments of the present disclosure below with reference to the accompanying drawings. In the figures.

DESCRIPTION OF THE EMBODIMENTS

Various embodiments of the present disclosure will be described in detail below with reference to the accompanying drawings. In each accompanying drawing, the same element is denoted by the same or similar reference number. For the sake of clarity, each part in the accompanying drawings is not drawn to scale.

The present disclosure is not merely limited to these embodiments. In the detailed description of the present disclosure hereinafter, some specific detail parts are described in detail. The present disclosure may also be fully understood by those skilled in the art without the description of these details. For avoiding obscuring the essence of the present disclosure, well-known methods, processes, and procedures are not described in detail.

Specific implementations of the present disclosure will be further described in detail as examples in combination with the accompanying drawings and the embodiments.

Figure 1:
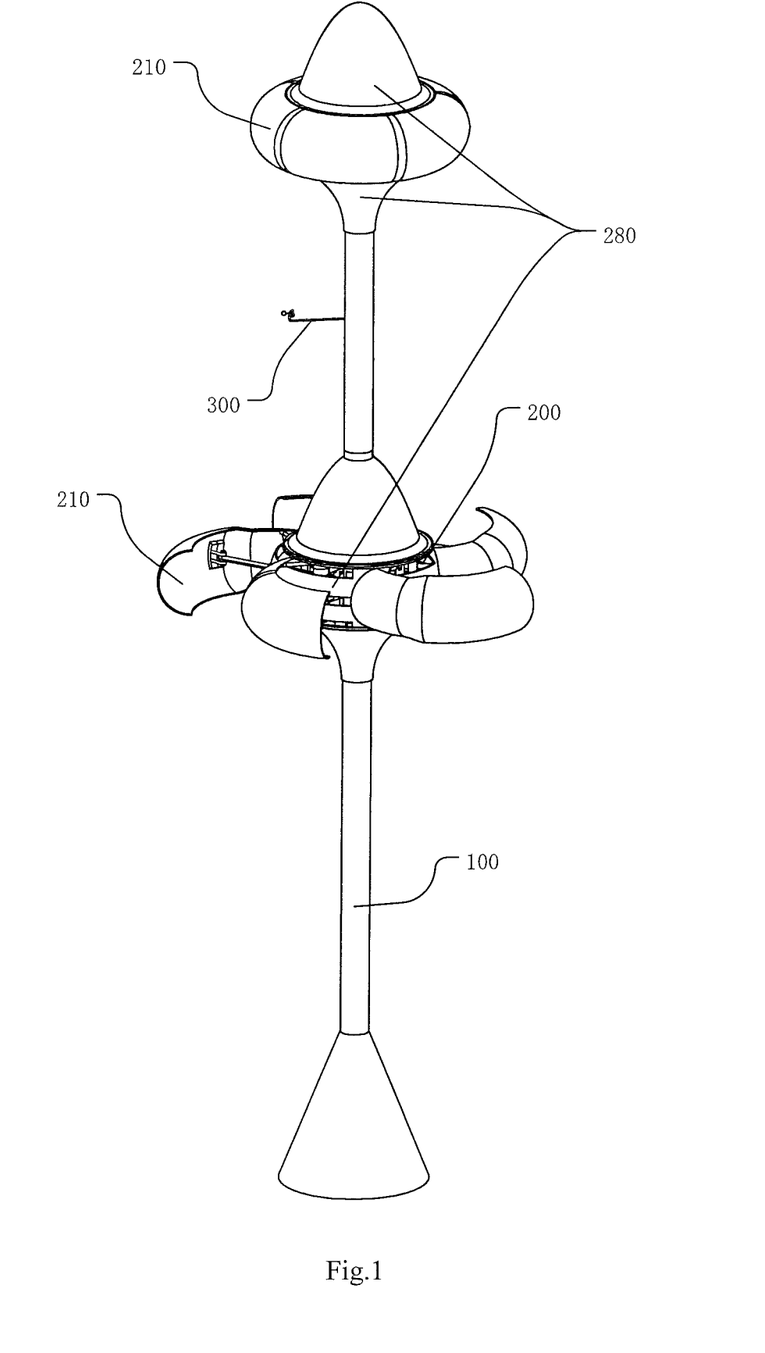
FIG. 1 is a schematic diagram of a power generation device according to a first embodiment of the present disclosure.

FIG. 1 is a schematic diagram of a power generation device according to a first embodiment of the present disclosure. The power generation device comprises a stand column 100 and two same generator sets 200 located on the stand column 100 and arranged up and down, wherein the stand column 100 is arranged perpendicular to a horizontal plane, a certain longitudinal interval is provided between the two generator sets 200. One or more blades 210 of each single generator set 200 may be unfolded and folded as required, each blade 210 is located on a side of the generator set 200. In order to clearly show the structure of each generator set 200, as shown in the figure, each blade 210 comprised by the generator set 200 located above is in a folded state, and each blade 210 comprised by the generator set 200 located beneath is in an unfolded state.

Each generator set 200, for example, may comprise a plurality of blades 210, the plurality of blades 210 are arranged in a circumferential array, the number of the blades 210 is preferably an odd number, and specifically, each generator set 200 may comprise five blades 210 which are arranged in a circumferential array.

Further, each generator set 200 comprises a protective housing 280, wherein the protective housing 280 is divided into 3 sections (an upper section, a middle section and a lower section), which are used for protecting the components inside the generator set 200, respectively. At least a portion of the protective housing 280 has a certain streamlined shape, which is designed to reduce windage resistance. Specifically, the upper section of the protective housing 280 is of a closed circular-cone shape, as shown in FIG. 2, a power generator 270, a gearbox 262, a gear set 261, a first shaft sleeve 251, a second shaft sleeve 252, an electric slip ring 240 and other components are arranged inside the upper section of the protective housing 280; the middle section of the protective housing 280 is a flat-placed tire shape with upper and lower portions opened, several open grooves are provided in a side thereof to facilitate a corresponding blade connection rod 213 and a corresponding hydraulic rod 221 to move, and an upper sealing strip and a lower sealing strip making contact with each other are arranged in the open grooves so as to guarantee that the interior of the middle section of the protective housing 280 is relatively sealed when the corresponding blade connection rod 213 and the corresponding hydraulic rod 221 move; the lower section of the protective housing 280 is of a reverse-circular-cone shape with upper and lower portions opened, a side surface of the lower section is closed/sealed, and a lower end of the lower section is narrowed gradually toward the stand column 100 but does not make contact with the stand column 100, so as to make rainwater permeating from one or more open grooves of the middle section flow out; upper and lower edges of the middle section of the protective housing 280 are fixed to the upper section and the lower section of the protective housing 280 respectively, an inner wall of an upper portion of the upper section of the protective housing 280 is fixed to the second shaft sleeve 252 by means of a connection component, an inner wall of a lower portion of the upper section of the protective housing 280 is fixed to an upper portion of a support 220, an inner wall of an upper portion of the lower section of the protective housing 280 is fixed to a lower portion of the support 220, and the upper, middle and lower sections of the protective housing 280 rotate along with the rotation of the support 220, so as to drive the second shaft sleeve 252 to rotate.

The stand column 100 is further provided with an anemograph 300 to detect a current wind speed, when the wind speed is too large and may cause overspeed rotation problem on the generator set 200, one or more blades 210 of the generator set 200 are controlled to be folded (or closed up), and the windage area of each blade 210 is gradually reduced until that blade 210 is completely folded, such that overspeed rotation problem of the generator set 200 is prevented.

At least partial regions of outer side surfaces of the blades 210 and the protective housing 280 of the generator set 200 are further provided with solar cell panels, and each solar cell panel, for example, uses a flexible ultra-thin design, and may be tightly attached to an attached surface while lightweight; and the solar cell panel rotates along with the generator set 200, such that each solar cell panel may be irradiated, and due to the fact that the solar cell panel is frequently in a rotating state, solar cell panel burning damage caused by long-term direct sunlight irradiation can be reduced, and the service life of the solar cell panel can be prolonged.

Figure 2:
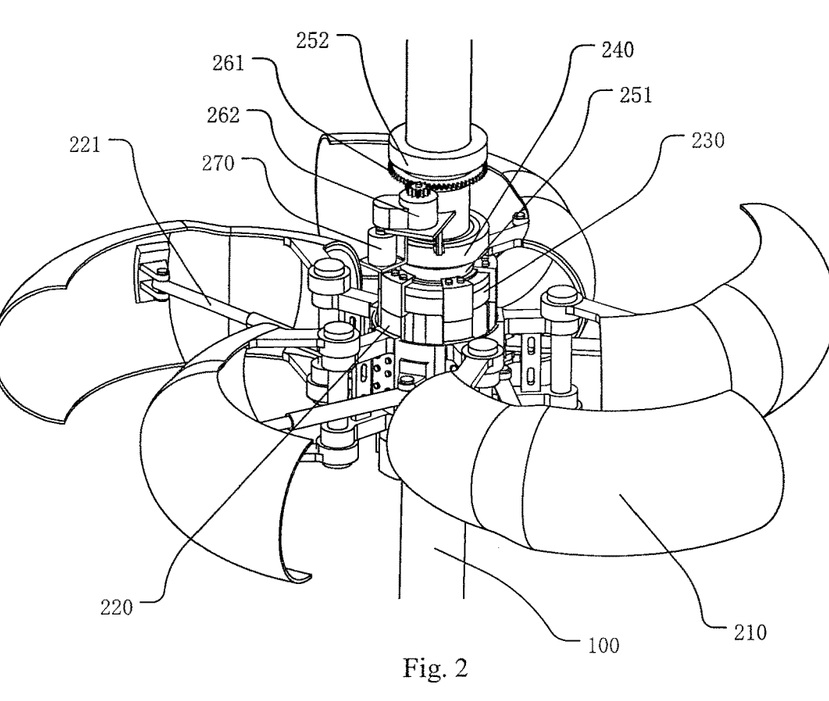
FIG. 2 is a schematic diagram of a generator set, with blades unfolded, according to the first embodiment of the present disclosure.
Figure 3:
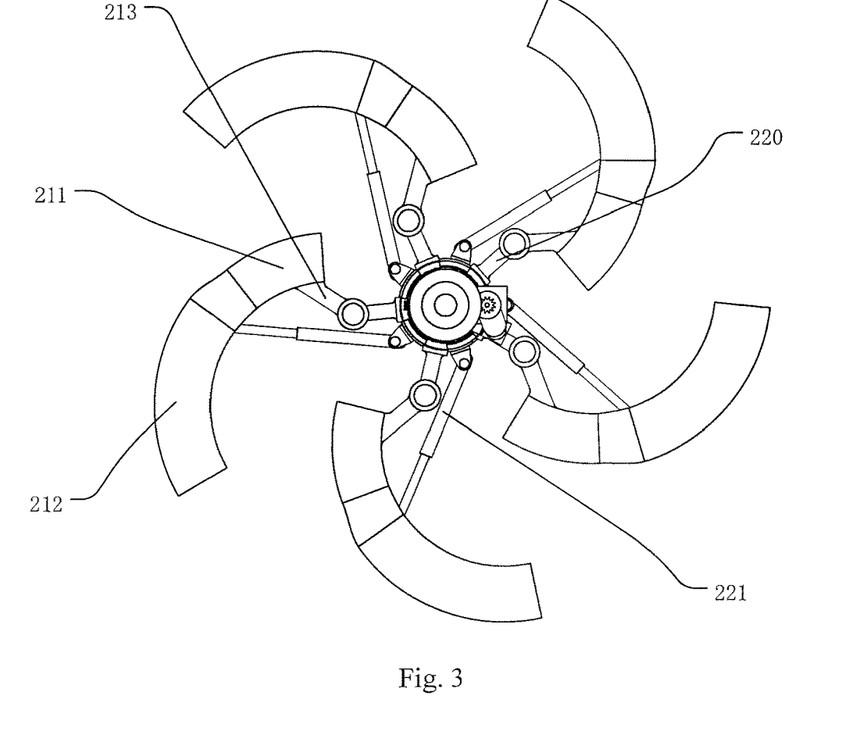
FIG. 3 is a top view of the generator set, with the blades unfolded, according to the first embodiment of the present disclosure.

FIG. 2 and FIG. 3 show a schematic diagram and a top view of the generator set, with the blades unfolded, according to the first embodiment of the present disclosure respectively; and for showing an internal structure of the generator set, the protective housing 280 are omitted from the FIG. 2 and FIG. 3. As shown in the FIG. 2 and FIG. 3, the generator set comprises: the blades 210, the support 220, a bearing 230, the first shaft sleeve 251, the electric slip ring 240, the second shaft sleeve 252, the gear set 261, the gearbox 262 and the power generator 270.

The support 220 is connected to the stand column 100 by means of the bearing 230, such that the support 220 may freely rotate around the stand column 100. The first shaft sleeve 251 and the second shaft sleeve 252 are connected to the support 220 directly or indirectly, and clearances are provided between inner sides of the two shaft sleeves and the stand column 100, such that the two shaft sleeves rotate along with the rotation of the support 220. Specifically, the first shaft sleeve 251, for example, is connected to the support 220 at a lower portion of the first shaft sleeve, the second shaft sleeve 252, for example, is connected to the support 220 by means of the protective housing 280, the electric slip ring 240, for example, is fixed to an upper portion of the first shaft sleeve 251, a rotor of the electric slip ring 240 rotates along with the rotation of the first shaft sleeve 251, and a stator of the electric slip ring 240 is fixed to the stand column 100 by means of a connection rod 241 (which is invisible in the figure due to an angle, of which the structure can be seen in FIG. 5).

The generator set further comprises a transmission device, the rotation of the blades 210 are transmitted to the power generator 270 by means of the transmission device, the transmission device in the figure comprises the gear set 261 and the gearbox 262, two gears in the gear set 261, for example, are arranged on an outer surface of a lower portion of the second shaft sleeve 252 and an input end of the gearbox 262 respectively, the rotation of the second shaft sleeve 252 is transmitted to the gearbox 262, and an output end of the gearbox 262 is connected to the power generator 270, thereby driving the power generator 270 to rotate to generate power. Further, the power generator 270 and the gearbox 262 are both arranged on a support platform horizontally extending from the stand column 100.

Each blade 210 of the generator set is of a bent pipe shape with a side opening, for making the structure be more compact after that blade 210 is folded, each blade further has a sectional-type design, a pipe diameter of a second section 212, distal from the stand column, of the blade is slightly greater than that of a first section 211, proximal to the stand column, of the blade, a length of the second section 212 of the blade is greater than that of the first section 211, a slope-shaped or arc-shaped transition section is provided between the two sections, alternatively, the transition section may be of a step shape, thereby making upper edges and lower edges of the three sections of the blade 210 of the generator set be buckled and attached to an outer surface of the middle section of the protective housing 280, and making an edge of a front end of the second section 212 of that blade 210 be buckled and attached to the transition section of another blade 210 which is adjacently arranged in front of that blade 210, so that the folded structure is tighter; the folded blades 210 form a circular-ring-shaped housing tightly attached to the protective housing 280 on a side of the generator set and form a streamlined top-like body together with the protective housing 280 which has smooth surface, and therefore the effective windage area used for rotating to generate the power can be reduced to zero, the windage area and windage resistance of the generator set can be greatly reduced, overspeed rotation problem on the generator set under a high-speed wind condition can be prevented, and overload of the power generator, violent apparatus shaking and even serious damages, for example, caused by overturning, can be avoided.

The connection rods 213 used for being connected to the support 220 are arranged on upper and lower sides of one end, proximal to the stand column, of the first section 211 of each blade 210, and each blade 210 is hinged to the support 220 by means of the connection rods 213, such that each blade 210 may rotate around a corresponding hinge point.

Further, an inner side of each blade 210 is further provided with an adjustment device for adjusting the windage area of that blade 210 by rotating that blade 210 according to the wind speed. The adjustment device, for example, uses the corresponding hydraulic rod 221, and the corresponding hydraulic rod 221, for example, is implemented by an electric hydraulic rod for driving that blade 210 to be unfolded and folded. A fixed end of the hydraulic rod 221, for example, is hinged to the support 220, a free end of the corresponding hydraulic rod 221 is hinged to a position, proximal to the first section 211 of that blade, of the inner side of the second section 212 of that blade, and the corresponding hydraulic rod 221 has a certain length, such that a rotatable angle of that blade is not less than 90 degrees. Alternatively, the corresponding hydraulic rod 221 may also be replaced by other structure capable of doing linear reciprocating motion, and for example, an air pressure rod or a lead screw may be selected.

Figure 4:
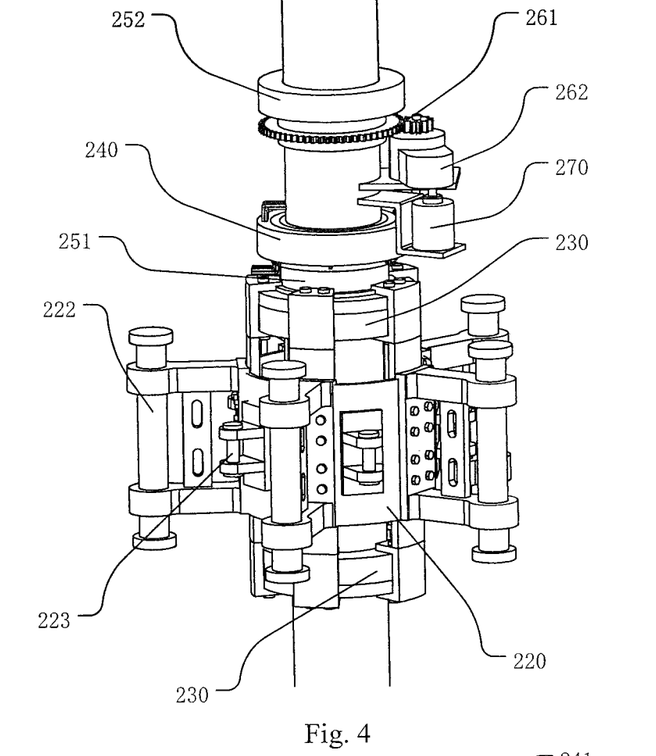
FIG. 4 is a schematic diagram of an internal structure of the generator set according to the first embodiment of the present disclosure.

FIG. 4 shows the internal structure of the generator set according to the first embodiment of the present disclosure, and it can be seen from the figure that the support 220 is connected to the stand column 100 by means of the bearings 230 at upper and lower ends, such that the support 220 may freely rotate in the vertical direction.

The support 220 comprises a plurality of first connection columns 222 and a plurality of second connection columns 223, which are used for being connected to the plurality of blades 210 and the plurality of hydraulic rods 221 respectively, wherein the first connection columns 222 are located outside the second connection columns 223, and one second connection column 223 is arranged between two adjacent first connection columns 222.

The generator set further comprises the first shaft sleeve 251, wherein the first shaft sleeve 251 is arranged on the stand column 100, a lower end of the first shaft sleeve 251 is closely adjacent to the bearing 230, the bottom of an outer wall of the first shaft sleeve 251 is provided with a protruding edge, the first shaft sleeve 251 is fixedly connected to the support 220 by means of the protruding edge, and a certain clearance is provided between an inner wall of the first shaft sleeve 251 and the stand column, thereby making the first shaft sleeve 251 rotate along with the support 220.

Further, the generator set further comprises the electric slip ring 240, wherein the electric slip ring 240 is used for transmitting a control signal in the stand column 100 to the plurality of hydraulic rods 221 located on the support 220, and each blade 210 is controlled to be unfolded and folded by controlling the extension/retraction of the corresponding hydraulic rod 221, so as to adjust the effective windage area of the corresponding blade.

The generator set further comprises the second shaft sleeve 252, wherein the second shaft sleeve 252 is similarly arranged on the stand column 100, for example, located above the first shaft sleeve 251 and the electric slip ring 240, and spaced form the first shaft sleeve 251 and the electric slip ring 240 by a certain longitudinal interval, the second shaft sleeve 252 has a step design, a diameter of a lower portion thereof is less than that of an upper portion thereof, an outer wall of the upper portion of the shaft sleeve 252, for example, is connected to the support 220 of the generator set by means of the protective housing, and a certain clearance is similarly provided between an inner wall of the second shaft sleeve 252 and the stand column 100, thereby making the second shaft sleeve 252 rotate along with the support 220.

Further, the generator set comprises the transmission device, wherein the transmission device, for example, comprises the gear set 261 and the gearbox 262, the output end of the gearbox 262 is connected to the power generator 270, and the gearbox 262 and the power generator 270, for example, are connected to the stand column 100 by means of the support platform; and further, one gear surrounding the outer wall of the second shaft sleeve is arranged on the lower portion of the shaft sleeve 252 of the generator set, the gear and the gear on the input end of the gearbox form the gear set 261, the gearbox 262 is driven to operate by means of the rotation of the second shaft sleeve 252, and then the power generator 270 connected to the gearbox 262 is driven to rotate. The power generator 270 generates the electric energy, and the generated electric energy is guided out by means of a wire inside the stand column. Certainly, the transmission device is not limited to a gear transmission mechanism and may also be replaced by other mechanisms, for example, an intersecting axis gear transmission, an alternating axis gear transmission, other types of parallel axis gear transmissions, a belt transmission, etc.

It can be seen from the above content that the generator set is connected to the stand column 100 only by the bearing 230, and certain clearances are provided between the inner walls of the first shaft sleeve 251 and the second shaft sleeve 252 and the stand column 100, such that the generator set may rotate around the stand column 100 and drive the power generator 270 to generate power by means of the second shaft sleeve 252, the corresponding blade 210 is driven by the corresponding hydraulic rod 221 to be unfolded and folded, and the control signal is transmitted from the interior of the stand column 100 to the plurality of hydraulic rods 221 by means of the electric slip ring 240.

Figure 5:
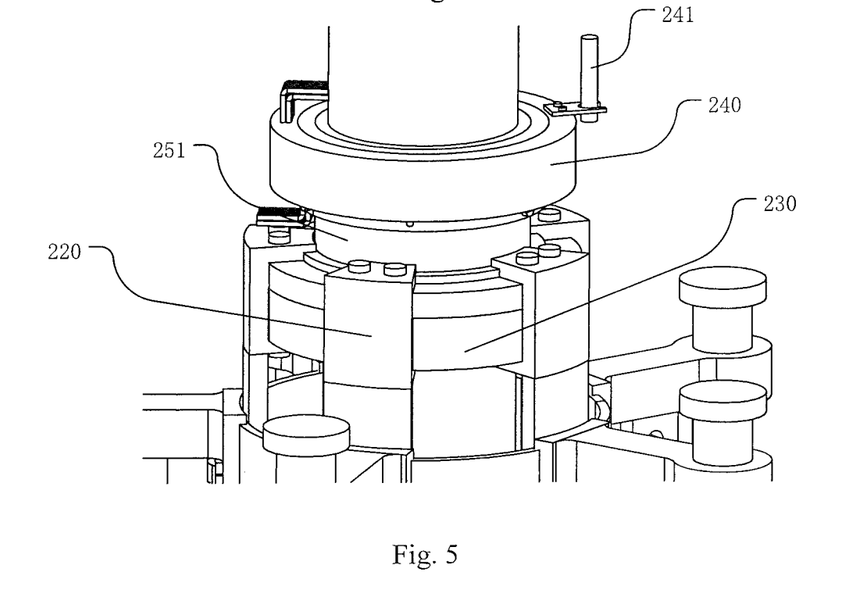
FIG. 5 is a partially enlarged diagram of an electric slip ring of the generator set according to the first embodiment of the present disclosure.

FIG. 5 shows a partial enlarged diagram of the electric slip ring of the first embodiment of the present disclosure, it can be seen from the figure that the first shaft sleeve 251 is arranged on the stand column 100, the lower end of the first shaft sleeve 251 is closely adjacent to the bearing 230, the bottom of the outer wall of the first shaft sleeve 251 is provided with a protruding edge, the first shaft sleeve 251 is fixedly connected to the support 220 by means of the protruding edge, and a certain clearance is provided between the inner wall of the first shaft sleeve 251 and the stand column 100, thereby making the first shaft sleeve 251 rotate along with the support 220.

Further, the generator set is further provided with the electric slip ring 240, and the electric slip ring 240 comprises the rotor and the stator, wherein the rotor of the electric slip ring 240 is located, for example, on an inner side, the stator is located on an outer side, an inner side wall of the rotor of the electric slip ring 240 is connected to an upper portion of an outer wall of the first shaft sleeve 251, and rotating with the first shaft sleeve 251, the stator of the electric slip ring 240 is fixedly connected to the stand column 100 by means of the connection rod 241. A control wire of the plurality of hydraulic rods 221 is connected to the rotor of the electric slip ring 240 and is connected to a control system by means of the stator of the electric slip ring 240 and through the wire located inside the stand column 100, so as to control the blades 210 to be unfolded and folded.

Certainly, the electric energy generated by the solar cell panel located on the generator set may also be guided into a solar power generation wire inside the stand column 100 by means of the electric slip ring 240, the solar power generation wire is connected to a solar power charge controller, and the solar power charge controller supplies power outwards. The generator set forms a structure that the solar cell panel and wind power generate power in parallel.

Figure 6:
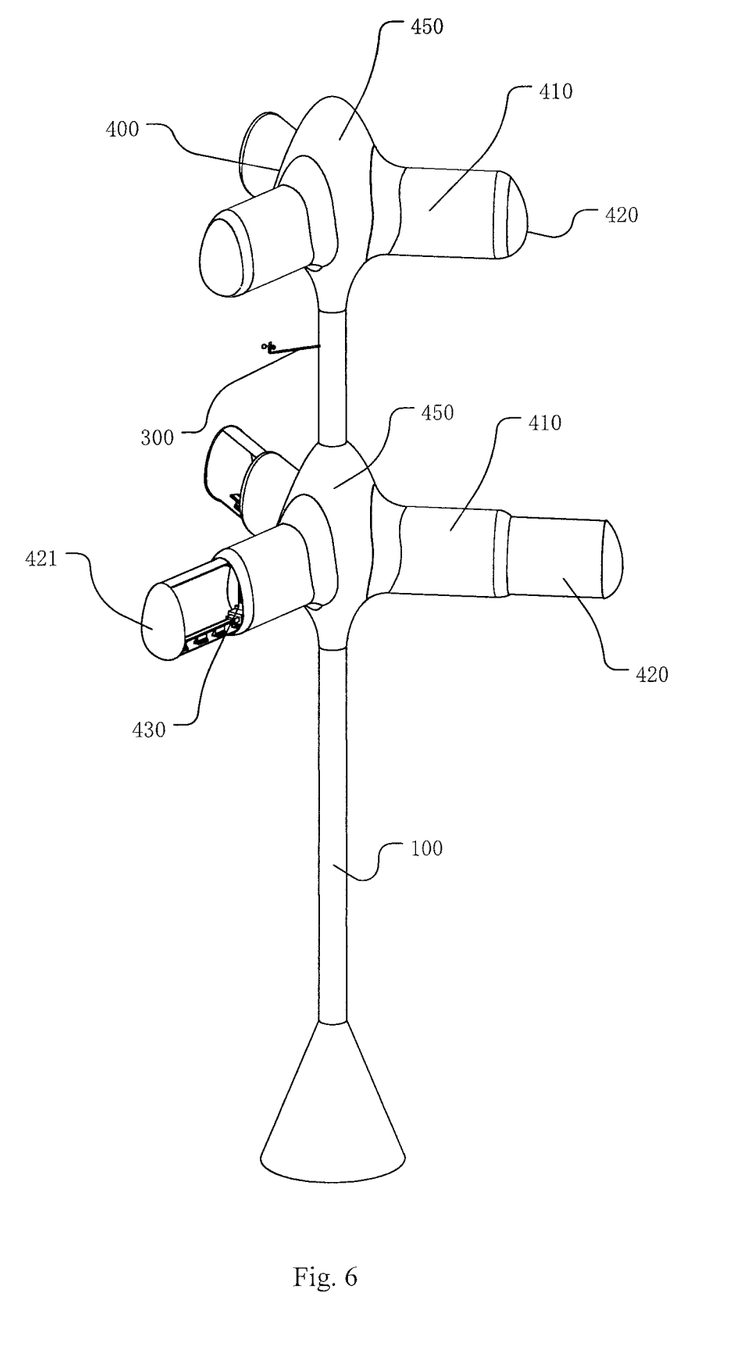
FIG. 6 is a schematic diagram of a power generation device according to a second embodiment of the present disclosure.

FIG. 6 is a schematic diagram of a power generation device according to a second embodiment of the present disclosure. The power generation device comprises a stand column 100 and two same generator sets 400 located on the stand column and arranged up and down, wherein a certain longitudinal interval is provided between the two generator sets 400, one or more blades 420 of one of the generator sets 400 may extend and retract as required in a radial direction of the stand column 100, each blade 420 is located inside a corresponding one of one or more blade cabins 410 located on a side of the generator set and connected to a support 430. In order to make a structure of the generators set 400 clearer, as shown in the figure, each blade 420 of the generator set 400 located above is in a folded state, and each blade 420 of the generator set 400 located beneath is in an unfolded state.

The side of one of the generator sets 400 comprises a plurality of blade cabins 410 in one-to-one correspondence to the blades 420, wherein each blade cabin 410 is of a thin-wall barrel shape, a radial cross section thereof is of a bilaterally-symmetrical oval shape with a lower portion and an upper portion narrower than the lower portion, a cover plate blocks an inner side of that blade cabin 410 to guarantee sealing of the interior of the generator set 400 and prevent gravels and dust from entering, openings are provided in an outer side of that blade cabin to facilitate the corresponding blade 420 to move, the blade cabins are arranged in a circumferential array and each extends in the radial direction from a center of the generator set 400, each blade cabin 410 is internally fixed to the support 430, each blade 420 may extend out of the corresponding blade cabin 410 along the support 430, a radial cross section of each blade 420 is of a "C" shape, an outer side end of that blade 420 is provided with a streamlined cabin cover 421, an edge of the cabin cover 421 matches the opening of the corresponding blade cabin 410, thus under a circumstance that blade 420 retracts into the corresponding blade cabin 410, the cabin cover 421 blocks the opening of that corresponding blade cabin 410.

The stand column 100 is further provided with an anemograph 300 to detect a current wind speed, when the wind speed is too large and may cause overspeed rotation problem of the generator set 400, one or more blades 420 of the generator set 400 is controlled to retract, and a windage area thereof is gradually reduced until each blade 420 completely retracts and the effective windage area is zero, such that overspeed rotation problem of the generator set 400 can be prevented.

Further, each generator set 400 further comprises a protective housing 450, the protective housing 450 is used for protecting each component inside the generator set 400, the protective housing 450 is designed to be streamlined, and specifically, the protective housing 450 is of a rugby-like shape for windage resistance reduction. An inner wall of an upper portion of the protective housing 450 is fixed to a second shaft sleeve 252 by means of a connection component, and a middle portion of the protective housing 450 is connected and fixed to the plurality of blade cabins 410.

At least partial regions of outer surfaces of the protective housing 450, one or more blades 420 and one or more blade cabins 410 of the generator set 400 are further equipped with solar cell panels, each solar cell panel, for example, uses a flexible ultra-thin design, and may be tightly attached to the attached surface while being lightweight; and the solar cell panel rotates along with the generator set 400, such that each solar cell panel may be irradiated, and due to the fact that each solar cell panel is frequently in a rotating state, burning damage caused on that solar cell panel by long-term direct sunlight irradiation can be reduced, and the service life of that solar cell panel can be prolonged.

Figure 7:
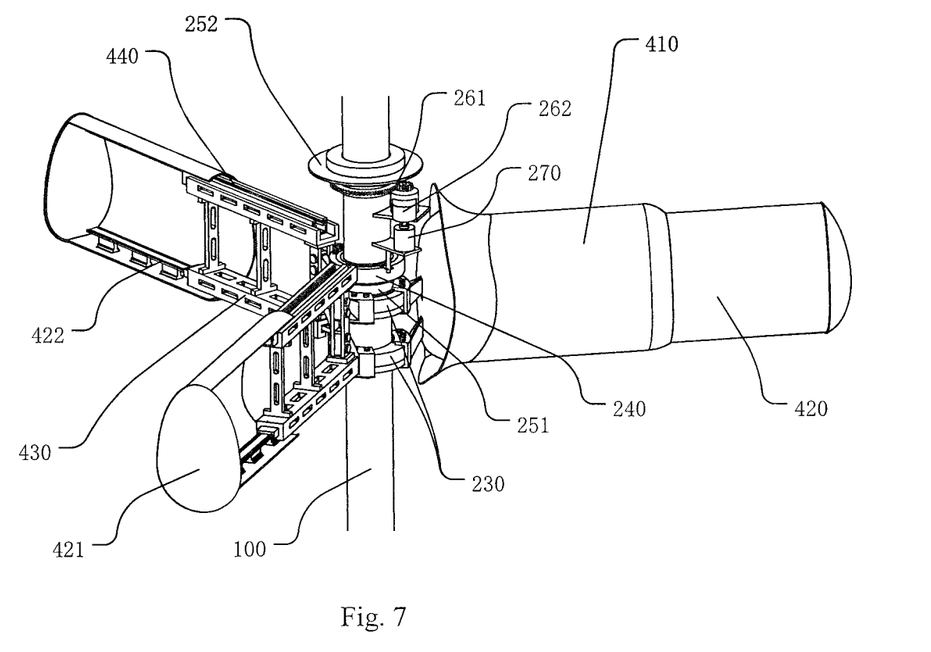
FIG. 7 is a schematic diagram of a generator set, with blades unfolded, according to the second embodiment of the present disclosure.
Figure 8:
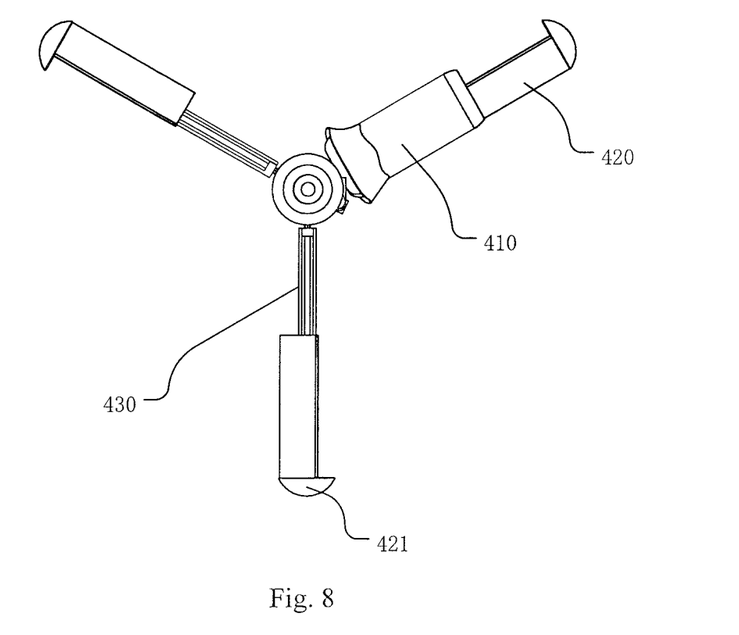
FIG. 8 is a top view of the generator set, with the blades unfolded, according to the second embodiment of the present disclosure.

FIG. 7 and FIG. 8 show a schematic diagram and a top view of the generator set, with the blades unfolded, of the second embodiment of the present disclosure; and for showing an internal structure of the generator set, the blade cabins 410 and the protective housing 450 are partially omitted in the FIG. 7 and FIG. 8. As shown in the FIG. 7 and FIG. 8, the generator set comprises: the plurality of blades 420, the plurality of blade cabins 410, the support 430, a bearing 230, a first shaft sleeve 251, an electric slip ring 240, the second shaft sleeve 252, a gear set 261, a gearbox 262 and a power generator 270.

The number of the blades 420 of the generator set is preferably an odd number, for example, three, the blade cabins 410 are also three in number and are used for accommodating the three blades 420 corresponding thereto, each blade cabin 410 is of the bilaterally-symmetrical thin-wall barrel shape with the opening facing outward, and the bottom of each blade cabin 410 is provided with a water outlet hole (which is invisible in the figures due to angle), thus, the situation that rainwater remains in the blade cabin 410, resulting in an increase of load of the generator set and an influence on wind power generation efficiency, can be prevented.

Each blade 420, for example, is of a longitudinally cut thin-wall straight circular-pipe shape, a longitudinal cross section thereof is of a "C" shape, a size of each blade 420 matches the corresponding blade cabin 410, and an outer side of that blade 420 is adjacent to an inner side of one side of the corresponding blade cabin 410; and an outer end of that blade 420 is provided with the streamlined cabin cover 421, the cabin cover 421 matches the opening of the corresponding blade cabin 410, when that blade 420 retracts into the corresponding blade cabin 410, the cabin cover 421 blocks the opening of the corresponding blade cabin 410, a surface of the generator set 400 is of a closed streamline type, the effective windage area used for rotating to generate power can be reduced to zero, the windage area and the windage resistance of the generator set are effectively reduced, and the overspeed rotation problem of the generator set operated under a high-speed wind condition, resulting in abrasion increase of the generator set, shortening of the service life, the apparatus shaking, the apparatus damaging, etc. are prevented.

The support 430 comprises a plurality of identical structures arranged in a circumferential array, each of the structures matches a corresponding one of the plurality of blade cabins 410, the support 430 is connected to the stand column 100 by means of two bearings 230 arranged up and down, the support is provided with a plurality of slide rails 440, a corresponding position of an inner side of each blade 420 is provided with a bulge 422, the bulge 422 matches the corresponding slide rail 440, and each blade 420 is connected to the support 430 by means of the corresponding slide rail 440, such that that blade 420 may slide along the corresponding slide rail 440. The plurality of slide rails 440, for example, comprises the adjustment device, and the adjustment device is controlled to drive each blade to linearly reciprocate along the corresponding slide rail 440 and make each blade extend out of and retract into the corresponding blade cabin 410.

The first shaft sleeve 251 and the second shaft sleeve 252 are connected to the support 430 directly or indirectly, and a gap is provided between an inner side of each shaft sleeve and the stand column 100, such that the two shaft sleeves can rotate along with the rotation of the support 430. Specifically, the first shaft sleeve 251, for example, is connected to the support 430 at a lower portion of the first shaft sleeve, the second shaft sleeve 252, for example, is connected to the support 430 by means of the housing of the generator set, and the electric slip ring 240, for example, is located between the two shaft sleeves.

The generator set further comprises a transmission device, the rotation of the blades 420 is transmitted to the power generator 270 by means of the transmission device, the transmission device in the figure comprises the gear set 261 and the gearbox 262, two gears in the gear set 261, for example, are arranged on an outer surface of a lower portion of the second shaft sleeve 252 and an input end of the gearbox 262, respectively, the rotation of the second shaft sleeve 252 is transmitted to the gearbox 262, and an output end of the gearbox 262 is connected to the power generator 270, thereby driving the power generator 270 to rotate to generate power. Further, the power generator 270 and the gearbox 262 are both arranged on a support platform horizontally extending from the stand column 100.

Figure 9:
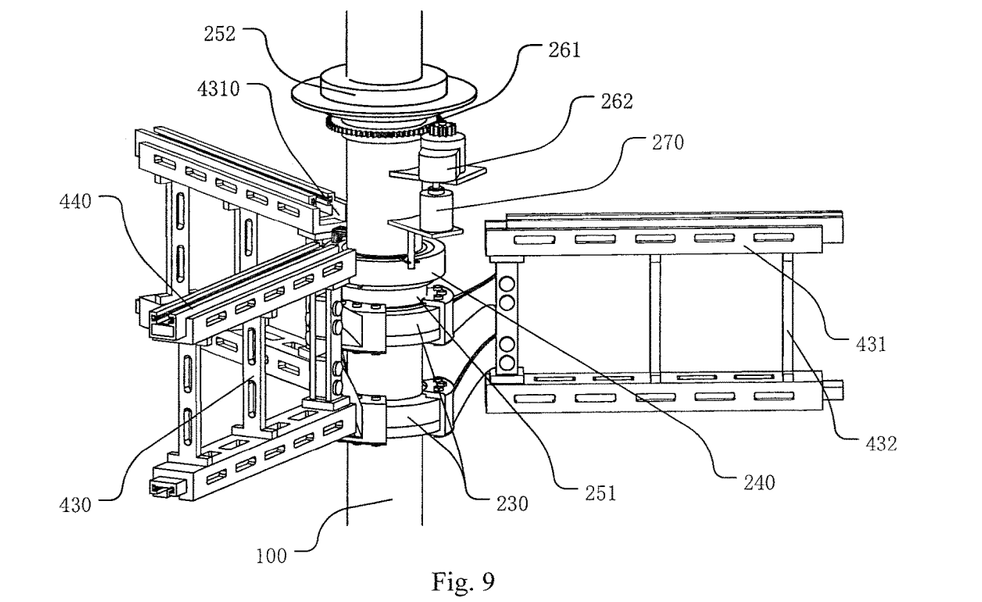
FIG. 9 is a schematic diagram of an internal structure of the generator set according to the second embodiment of the present disclosure.
Figure 10:
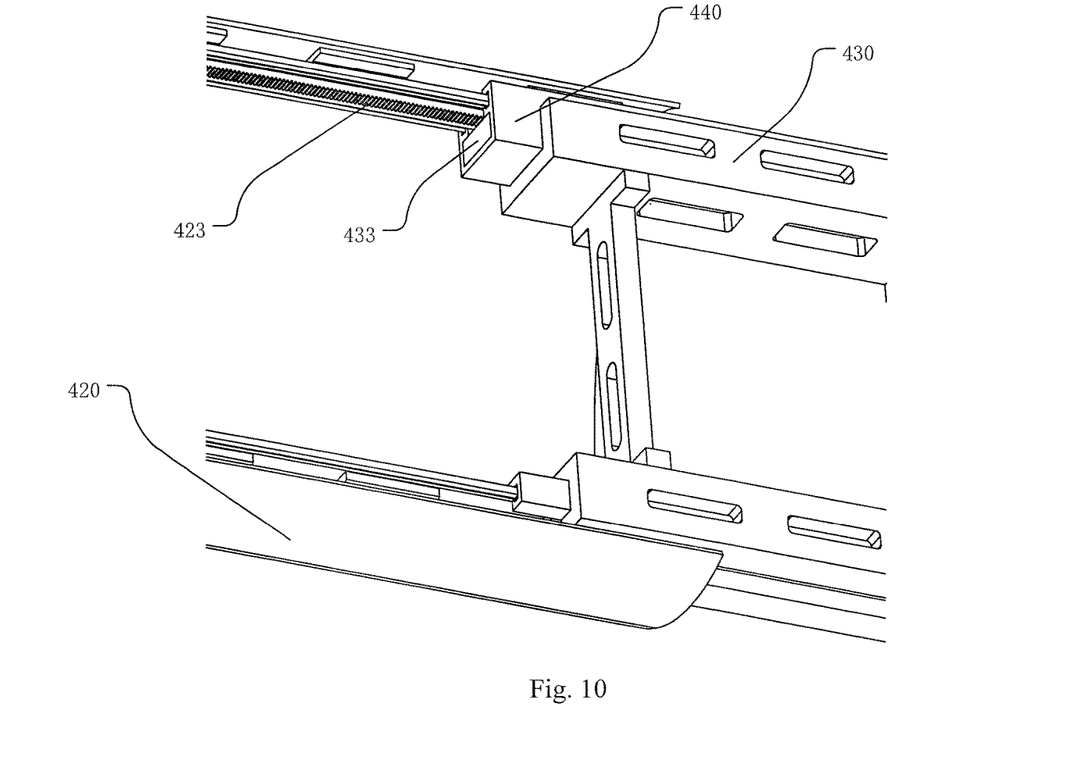
FIG. 10 is a partially enlarged diagram of a support and the blades of the generator set according to the second embodiment of the present disclosure.

FIG. 9 and FIG. 10 show an internal structure of the generator set and a partially enlarged diagram of the support according to the second embodiment of the present disclosure, and it can be seen from the figures that the support 430 is connected to the stand column 100 by means of the bearings 230 arranged up and down, such that the support 430 may freely rotate in the vertical direction.

The support 430 comprises the plurality of identical structures arranged in the circumferential array, each of the structures matches a corresponding one of the plurality of blade cabins 410, each of the structures comprises two parallel skeletons 431 extending outwards, and a longitudinal supporting component 432 is connected between the two skeletons 431; and with one skeleton 431 located above as an example, the skeleton 431 is provided with an groove 4310 facing upwards, the groove 4310 is used for carrying the corresponding slide rail 440. Each slide rail 440 is fixedly connected to the support 430, the plurality of slide rails 440 may be provided with the adjustment device, the adjustment device is controlled to drive each blade 420 to move along the corresponding slide rail 440 and make each blade 420 extend out of and retract into the corresponding blade cabin 410.

Specifically, as shown in FIG. 10, each slide rail 440, for example, is an electric slide rail, the adjustment device drives a rack 423 to linearly move front and back by means of an internally arranged gear 433 (only its position is shown, and its specific structure is invisible) and a control electric motor (not shown in the figure) of the gear. The rack 423, for example, is fixed to a lower surface of an upper portion of the inner side of the corresponding blade 420, and the rack 423 moves front and back to drive the corresponding blade 420 to move along that slide rail 440 front and back, so as to control that blade 420 to extend out of or retract into the corresponding blade cabin 410.

Like the first embodiment, the generator set according to the second embodiment similarly comprises the first shaft sleeve 251, wherein the first shaft sleeve 251 is arranged on the stand column 100, a lower end of the first shaft sleeve 251 is closely adjacent to the bearing 230, the bottom of an outer wall of the first shaft sleeve 251 is provided with a protruding edge, the first shaft sleeve 251 is fixedly connected to the support 430 by means of the protruding edge, and a certain gap is provided between an inner wall of the first shaft sleeve 251 and the stand column, thereby making the first shaft sleeve 251 rotate along with the support 430.

Further, the generator set comprises the electric slip ring 240, wherein the electric slip ring 240 is used for transmitting a control signal in the stand column 100 to the slide rails 440 located on the support 430, and each blade 420 may be controlled to extend and retract by control of the adjustment device on the slide rails 440, so as to adjust the effective windage area of the blades.

The generator set further comprises the second shaft sleeve 252, wherein the second shaft sleeve 252 is similarly arranged on the stand column 100, for example, located above the first shaft sleeve 251 and the electric slip ring 240, and spaced form the first shaft sleeve 251 and the electric slip ring 240 by a certain longitudinal interval, the second shaft sleeve 252 is designed to have a step, a diameter of a lower portion thereof is less than that of an upper portion thereof, an outer wall of the upper portion of the shaft sleeve 252, for example, is connected to the support 430 of the generator set by means of the protective housing 450, and a certain gap is similarly provided between an inner wall of the second shaft sleeve 252 and the stand column 100, thereby making the second shaft sleeve 252 rotate along with the support 430.

Further, the generator set comprises the transmission device, wherein the transmission device, for example, comprises the gear set 261 and the gearbox 262, the output end of the gearbox 262 is connected to the power generator 270, and the gearbox 262 and the power generator 270, for example, are connected to the stand column 100 by means of the support platform; and further, one gear surrounding the outer wall of the second shaft sleeve is arranged on the lower portion of the shaft sleeve 252 of the generator set, the gear and the gear on the input end of the gearbox form the gear set 261, the gearbox 262 is driven to operate by means of the rotation of the second shaft sleeve 252, and then the power generator 270 connected to the gearbox 262 is driven to rotate. The power generator 270 generates the electric energy, and the generated electric energy can be transmitted out by means of a wire inside the stand column.

It can be seen from the above content that the generator set is connected to the stand column 100 only by the bearing 230, and a certain gap is provided between the inner wall of each shaft sleeve (251, 252) and the stand column 100, such that the generator set may rotate around the stand column 100 and drive the power generator 270 to generate power by means of the second shaft sleeve 252, each blade 420 is driven by the gear 433 and the electric motor inside the corresponding slide rail 440 to extend and retract, and the control signal is transmitted from the interior of the stand column 100 to the gear control electric motor (not shown in the figure) arranged inside the corresponding slide rail 440 by means of the electric slip ring 240.

For reducing the weight of each generator set, the protective housing, the blades, the support and other components of the generator set are made of lightweight metal or alloy, and the support uses a hollow design for further reducing the total weight of the generator set.

Further, the above mentioned embodiments are both in a single-stand-column double-generator-set form, but the present disclosure may be designed into large, medium or small generator set with different sizes according to outdoor actual requirements and a condition on site in actual use, and the present disclosure may also be assembled into a multi-unit parallel generator set, for example, a vertical overlaying type, a horizontal linear type, a horizontal matrix type, a vertical matrix type, a horizontal star type, a multi-layer star type, an irregular tree type and other modes.

In summary, the embodiments of the present disclosure have following advantages or beneficial effects: the power generation device disclosed in the present disclosure is a vertical-shaft wind power generation device, the adjustment device may adjust the windage area of the one or more blades by moving or rotating each blade according to the wind speed, the effective windage area of the power generation device can be reduced to zero under a circumstance that the wind force is too high, such that the overspeed problem of the generator set can be thoroughly solved, thus the abrasion increase, service life reduction, apparatus shaking and damage, which are caused by overspeed of the generator set, can be effectively prevented, and the device may have strong stability, adaptability and a relatively long service life. The wind power generation device may further adaptively adjust the windage area thereof according to the wind speed, so as to improve the power generation efficiency thereof.

Further, by integrative designing, most region of the outer surface of the power generation device may be further equipped with one or more solar cell panels for solar power generation, and the device may collect both wind energy and solar energy simultaneously to achieve combined power generation of the wind energy and the solar energy. Each solar cell panel may rotate along with the generator set, such that burning damage caused on that solar cell panel by long-term direct sunlight irradiation may be reduced, prolonging the service life of that solar cell panel.

The power generation device is simple and reliable in structure, the generator set is connected to the stand column by means of the bearing directly or indirectly, such that it is convenient to be disassembled and assembled, and easy to be promote and used widely; the device further has a plurality of transformations and alternative arrangements, for example, a plurality of generator sets may be arranged on a single stand column longitudinally, such that a floor space can be effectively reduced, and the entire generation power can be improved; a specific arrangement can be selected according to different practical situations, such that the practicality is strong; and the device is further provided with the anemograph, thus full-automatic adjustment of each blade without manual operation may be achieved.

It is to be explained that the relationship terms, such as "first" and "second", are used herein only for distinguishing one entity or operation from another entity or operation but do not necessarily require or imply that there exists any actual relationship or sequence between these entities or operations. Furthermore, terms "comprising", "including" or any other variants are intended to cover non-exclusive inclusion, thereby making a process, method, object or apparatus comprising a series of elements comprise not only those elements but also other elements that are not listed explicitly or the elements inherent in the process, method, object or apparatus. In the case of no more limitations, the element limited by the sentence "comprising a . . . " does not exclude that there exists another identical element in the process, method, object or apparatus comprising the element.

The foregoing is merely the preferred embodiments of the present disclosure and is not intended to limit the present disclosure, and various modifications and changes may be made by those skilled in the art. Any modifications, equivalent substitutions, improvements, etc. within the spirit and principles of the present disclosure should fall within the scope of protection of the present disclosure.

The embodiments in accordance with the present disclosure are described as above, in which the proportions of the components are not drawn to true scale in order to highlight the details of the technical solution of the present disclosure, and the proportions and dimensions shown in the accompanying drawings shall not limit the essential technical solution of the present disclosure, and these embodiments do not fully describe all the details, and do not limit the present disclosure to the particular embodiments described only. Obviously, many modifications and changes may be made according to the above description. These embodiments have been chosen and described in detail in the specification to explain the principles and practical applications of the present disclosure better, such that those skilled in the pertinent art can make good use of the present disclosure and modified use on the basis of the present disclosure. The present invention is merely limited by the appended claims and the scope and equivalents thereof.

What is claimed is:

1. A power generation device, comprising:
a stand column; and
at least one generator set located on the stand column, wherein each one of said at least one generator set comprises a support, a plurality of blades connected to the support, and a power generator generating power by means of rotation of the plurality of blades,
wherein each of said at least one generator set further comprises an adjustment device, the adjustment device is located on the support and configured to adjust a windage area of the plurality of blades by moving or rotating the plurality of blades according to a wind speed,
wherein one of the at least one generator set further comprises a plurality of blade cabins arranged in an array distributed along a circumference direction of the stand column, and each of plurality of blade cabins is of barrel shape and extends in a radial direction of the stand column, and said one of the at least one generator set has a closed streamline surface when the plurality of blades are retracted into the plurality of blade cabins, respectively.

2. The power generation device according to claim 1, wherein the support is connected to the stand column by means of a bearing, and the support may rotate around the stand column.

3. The power generation device according to claim 1, wherein each of said at least one generator set further comprises a transmission device, the transmission device is configured to transmit the rotation of the plurality of blades to the power generator.

4. The power generation device according to claim 1, wherein each of said at least one generator set further comprises an electric slip ring arranged on the stand column, a control signal is transmitted from a wire inside the stand column to the adjustment device by means of the electric slip ring to control the adjustment device to move or rotate the plurality of blades, so as to adjust the windage area of the plurality of blades.

5. The power generation device according to claim 1, wherein at least a partial region of outer surfaces of said at least one generator set and the plurality of blades are equipped with a solar cell panel, the solar cell panel is configured to rotate along with said at least one generator set and provide electric energy generated by the solar cell panel to a wire inside the stand column by means of an electric slip ring.

6. The power generation device according to claim 1, wherein the stand column is further provided with an anemograph, the adjustment device is configured to adjust the windage area of the plurality of blades according to the wind speed, and under a circumstance that the wind speed is large enough to make said at least one generator set overspeed, the adjustment device is configured to reduce the windage area of the plurality of blades to zero.

7. The power generation device according to claim 6, wherein each of said at least one generator set further comprises a protective housing, the protective housing has a certain streamlined shape, and the protective housing is used for protecting each component inside the corresponding one of said at least one generator set.

8. The power generation device according to claim 7, wherein the plurality of blade cabins are located on a side of said one of the at least one generator set, and each is of a thin-wall barrel shape, a radial cross section of each one of the plurality of blade cabins is of a bilaterally-symmetrical oval shape, one end of each one of the plurality of blade cabins is vertically connected to the corresponding protective housing of said one of the at least one generator set, the support is located inside a corresponding one of the plurality of blade cabins.

9. The power generation device according to claim 8, wherein each of the plurality of blades is of a thin-wall straight circular-pipe shape which is partially cut in longitudinal direction, and has a size matching a corresponding one of the plurality of blade cabins, and is configured to move on the corresponding support in a radial direction of the stand column according to the adjustment device, so as to extend out of or retract into the corresponding one of the plurality of blade cabins.

10. The power generation device according to claim 9, wherein a cabin cover is arranged at one end, distal from the support, of each of the plurality of blades, under a circumstance that one of the plurality of blades retracts into a corresponding one of the plurality of blade cabins, the cabin cover is configured to block an outer side end of the corresponding one of the plurality of blade cabins.

11. The power generation device according to claim 10, wherein the support is provided with a plurality of slide rails, and each of the plurality of blades is connected to the support by means of a corresponding one of the plurality of slide rails.

12. The power generation device according to claim 11, wherein under a circumstance that all of the plurality of blades are folded, the corresponding one of said at least one generator set is in a completely closed state.

13. The power generation device according to claim 1, wherein a water outlet hole is arranged in bottom of each one of the plurality of blade cabins, and one end, proximal to the stand column, of one of the plurality of blade cabins is provided with a cover plate to block an inner side end of said one of the plurality of blade cabins.

14. A power generation device, comprising:
a stand column; and
at least one generator set located on the stand column, wherein each one of said at least one generator set comprises a support, a plurality of blades connected to the support, and a power generator generating power by means of rotation of the plurality of blades,
wherein each of said at least one generator set further comprises an adjustment device, the adjustment device is located on the support and configured to adjust a windage area of the plurality of blades by moving or rotating the plurality of blades according to a wind speed,
wherein each of the plurality of blades is designed in a sectional type, a first section of one of the plurality of blades is proximal to the support, a second section of said one of the plurality of blades is distal from the support, a diameter of a cross section of the first section of said one of the plurality of blades is less than that of a cross section of the second section of said one of the plurality of blades, the first section and the second section of one of said plurality of blades is of a bent circular-pipe shape partially cut in a longitudinal direction, and a slope-shaped, arc-shaped or step-shaped transition section is arranged between the first section and the second section of said one of the plurality of blades, an edge of a front end of the second section is capable of being buckled and attached to the transition section of an adjacent one the plurality of blades, so that a streamlined circular-ring-shaped housing is formed by the plurality of blades in folded state and the first section is positioned inside the streamlined circular-ring-shaped housing when the plurality of blades are folded completely.

15. The power generation device according to claim 14, wherein said plurality of blades are arranged in an array distributed along a circumference direction of the stand column and each extend in a radial direction of the stand column.

16. The power generation device according to claim 14, wherein the adjustment device comprises a plurality of hydraulic rods, a number of the plurality of hydraulic rods is equal to a number of the plurality of blades, one end of each of said plurality of hydraulic rods is hinged to the support, the other end of each of said plurality of hydraulic rod is hinged to a position, proximal to the first section of a corresponding one of the plurality of blades, of an inner side of the second section of that corresponding one of the plurality of blades, each of the plurality of blades is controlled by means of extension/retraction of the corresponding one of the plurality of hydraulic rods to be unfolded/folded, so that the plurality of blades form a spiral-arm-like structure when being unfolded, and the plurality of blades overlap end to end to form a circular ring structure when being folded.

17. The power generation device according to claim 14, wherein a total arc length of the plurality of blades is greater than a total length of a circular ring formed by the plurality of blades being folded, after the plurality of blades are folded, the second section of a first blade, which is any one of the plurality of blades, covers an upper portion of the first section of a second blade which is one of the plurality of blades and adjacently arranged in front of the first blade, an upper edge and a lower edge of each of the plurality of blades are closely attached to the protection housing, and an edge of a front end of the first blade is closely attached to the transition section of the second blade.

* * * * *